United States Patent [19]

Atoiants et al.

[11] 3,942,951
[45] Mar. 9, 1976

[54] CONTACT PLATE FOR MASS-EXCHANGE APPARATUS

[76] Inventors: Vladimir Sergeevich Atoiants, Zagorodny prospekt, 54, kv. 4; Igor Orestovich Protodiakonov, prospekt Morisa Toreza, 106, kv. 43; Petr Grigorievich Romankov, ulitsa Chaikovskogo, 63, kv. 11, all of Leningrad, U.S.S.R.

[22] Filed: Apr. 24, 1974

[21] Appl. No.: 463,844

[52] U.S. Cl. ........ 23/252 R; 23/267 R; 23/270.5 T; 137/625.31; 138/45; 202/158; 261/113; 259/DIG. 30; 259/105; 251/208
[51] Int. Cl.² .......................................... B01D 11/04
[58] Field of Search .... 23/270.5 R, 270.5 T, 270 R, 23/267 R, 269, 252; 137/625.31, 625.3; 261/113; 138/43, 45, 46 X; 259/DIG. 30, 105; 251/208; 196/14.52; 202/158

[56] References Cited
UNITED STATES PATENTS

| | | | |
|---|---|---|---|
| 1,176,747 | 3/1916 | Ferguson | 261/114 VT |
| 1,238,433 | 8/1917 | Peelersen | 251/208 |
| 1,751,591 | 3/1930 | McCloskey | 251/208 |
| 1,936,524 | 11/1933 | Placek | 202/158 |
| 1,964,300 | 6/1934 | Perry | 138/43 |
| 2,369,522 | 2/1945 | Bozille | 251/208 |
| 3,529,628 | 9/1970 | Cummins | 138/46 |
| 3,592,452 | 7/1971 | Katyal | 261/114 R |
| 3,746,322 | 7/1973 | Sawyer | 261/113 |

FOREIGN PATENTS OR APPLICATIONS

| | | | |
|---|---|---|---|
| 21,635 | 1906 | United Kingdom | 251/208 |
| 545,288 | 1932 | Germany | 251/208 |
| 405,461 | 1968 | Australia | 23/269 |
| 606,018 | 1926 | France | 138/46 |
| 680,278 | 10/1952 | United Kingdom | 259/DIG. 30 |
| 140,789 | 1961 | U.S.S.R. | 23/269 |

*Primary Examiner*—Jack Sofer
*Assistant Examiner*—S. J. Emery
*Attorney, Agent, or Firm*—Haseltine, Lake & Waters

[57] ABSTRACT

The contact plate for mass-exchange apparatus consists of two disks facing each other with their end surfaces and capable of mutual rotation round the axis thereof. Each disk has one slit-like hole shaped as an Archimedean spiral so that when one disk rotates with reference to the other said holes overlap each other.

2 Claims, 4 Drawing Figures

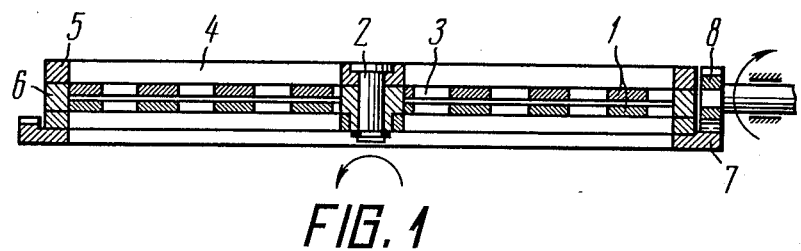
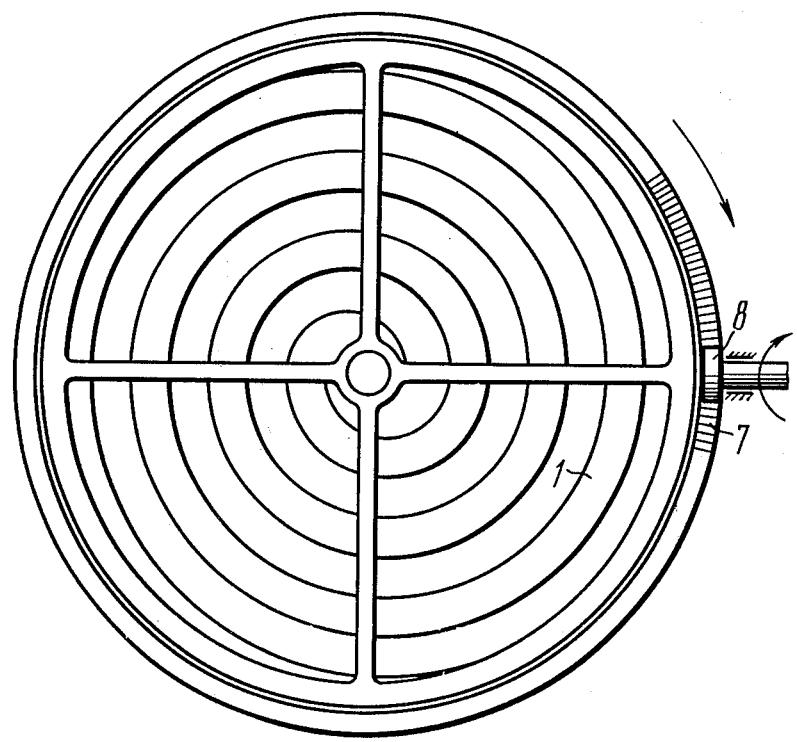

CONTACT PLATE FOR MASS-EXCHANGE APPARATUS

The present invention relates generally to chemical industry equipment employed in mass-exchange processes and has particular reference to contact plates for mass-exchange apparatus.

The herein-proposed contact plate can be made use of largely in adsorbers, desorbers, absorbers, foam generators, driers and some other mass-exchange apparatus, wherein operating conditions make possible loads variable according to the interacting phases and, on account of possible operational disturbances an automatic process regulation or its control by a computer proves to be necessary.

Many types of contact plates are known to use heretofore, composed of two disks facing each other with their end surfaces, capable of mutual rotating abount the axis thereof and having holes adapted to overlap each other in the course of said mutual rotation of the disks. The holes in the disks can be shaped diversely. For example, the contact plate is known to disclose in Japan Pat. No. 1221 of 1955, consisting of two similar disks, each having a plurality of perforations made circumferentially oblong.

When the disks of said plate rotate with respect to each other, the holes in the disks overlap one another, thus varying the flow-passage area of the plate, whereby the flow rate of the interacting phases passing through the plate mounted in a mass-exchange apparatus can be controlled.

However, said known plate involves gross technological difficulties to be manufactured and is costly. Besides, the free flow-passage area thereof is distributed very inadequately over its plane surface owing to which hydrodynamic conditions within different zones of the plate is dissimilar.

This results in that the contacting phases pass largely through one of the zones of the plate and therefore interact unevenly in the different zones thereof.

This holds true especially of the case where one of the interacting phases is loose solid or viscid pastelike material.

When the plate free passage area is reduced in the course of its control, the size of the holes decreases and their spacing increases which still more increases inadequate distribution of the free flow-passage area over the plate, i.e., the shorter the plate holes the more uniformly is distributed its free-flow passage area over the surface thereof. However, shorter holes result in adversely affected accuracy of control of the free passage area and, thus, the herein-discussed plate, on account of small size of its holes, is largely intended for treating liquid phase, while its operation with loose solids and especially with viscid and pastelike materials is highly unsatisfactory.

Low regulating accuracy is one more disadvantage of the herein-considered contact plate.

Making the holes circumferentially longer is aimed at greater accuracy of the free passage area regulation, but this yet proves to be the cause of an inadequate distribution of contact plate free passage area over the surface thereof in the course of regulation. Thus, the correlation between the regulating accuracy of the free passage area and its distribution over the plate surface is quite evident. That is why the plates of such a construction suffer from a restricted regulating accuracy of the free passage area thereof. In really available constructions of mass-exchange apparatus making use of said contact plates, the regulating accuracy is very low, and the hydrodynamic conditions at the plate centre much diverge from those at the periphery thereof.

It is an essential object of the present invention to provide such a contact plate for mass-exchange apparatus that would ensure an accurate regulation of the free passage area thereof, render the regulating accuracy of the free passage area independent of the hole size and plate diameter, as well as a uniform distribution of the plate free passage area over the surface thereof for any mutual position of the disks and any size of the holes therein so as to provide similar flow rate conditions for the contacting phases within all the zones of the plate.

Said objects are accomplished due to the fact that in a contact plate for mass-exchange apparatus, composed of two disks facing each other with their end surfaces enabled to mutually rotate round their axis and provided with holes adapted to overlap one another in the course of said disk rotation, according to the invention each disk has one slit-like hole shaped as an Archimedean spiral whose centre coincides with the centre of the disk.

In the proposed contact plate a uniform distribution of its free passage area over the surface thereof regardless of the position assumed by the disks. Besides, the width of the slot is practically constant throughout its length and the spacing of the adjacent turns of the spiral is the same in any zone of the plate.

The angle of mutual rotation of the disks in the proposed plate is to be not less than 180°, while the regulating accuracy of the free passage area of the plate is maximum attainable for the plates with rotary disks. Moreover, the regulating accuracy increases with an increase in the plate diameter.

In what follows the invention is illustrated by an exemplary embodiment thereof with due reference to the accompanying drawings, wherein:

FIG. 1 is a longitudinal-section view of a contact plate for mass-exchange apparatus, according to the invention;

FIG. 3 is a contact plate according to the invention showing its disks in the position corresponding to the plate being fully open.

Figure 2:
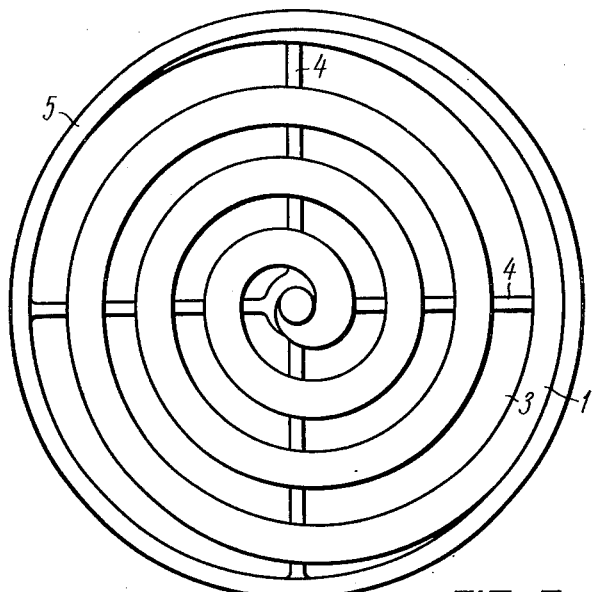
FIG. 2 is a disk of the contact plate, according to the invention.

The contact plate for mass-exchange apparatus consists of two disks 1 (FIG. 1) facing each other with their end surfaces. The disks 1 are set on pivot pin 2 so as to rotate with respect to each other. Each disk 1 has a hole made as a slit 3 (FIGS. 1, 2) shaped as archimedean spiral whose centre coincides with the centre of the disk 1. The width of the slit 3 and the spacing of its turns may be various so as to suit the technological requirements imposed upon the plate.

To impart more rigidity to the disk 1 the latter can be provided with stiffeners 4 and enclosed in a rim 5. A setting ring 6 (FIG. 1) is fitted in between the disks 1 adapted to preclude the interacting phases from passing radially along the plate.

The contact plate is mounted in a mass-exchange apparatus, wherein provision shall be made for a device effecting mutual rotation of the disks 1. To this end, one of the disks can be held in position on the mass-exchange apparatus, while the other disk can be provided with a gear wheel 7 (FIGS. 1, 3) adapted to interact with a gear wheel 8 provided in the mass-exchange apparatus.

The proposed contact plate when mounted in a mass-exchange apparatus, operates as follows.

Figure 4:
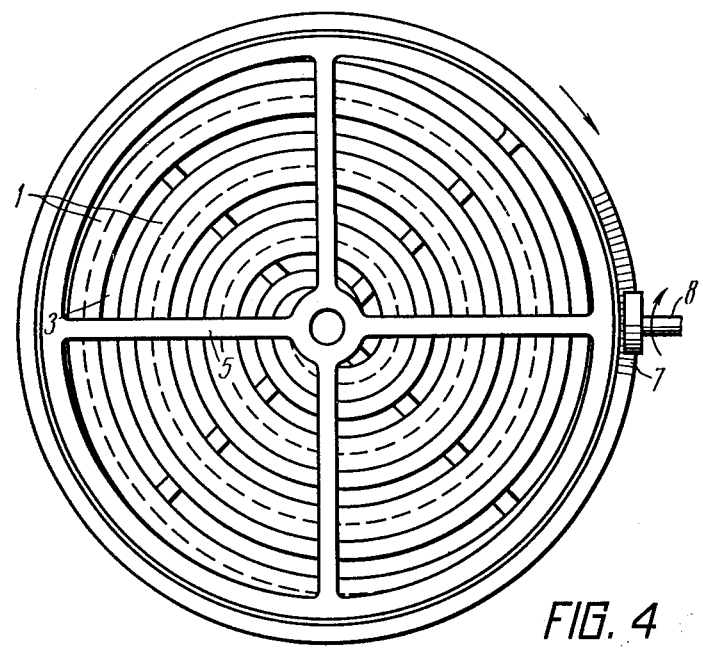
FIG. 4 is a contact plate according to the invention, showing the disks in the position corresponding to the plate partially open.

To change the flow rate of the contacting phases through the plate, caused by the variation in the free passage area thereof, one of the disks 1 of the contact plate is rotated with respect to the other disk which results in mutual overlapping of the slits 3 in both disks 1 and, eventually, in changing the free passage area of the plate. In this case the slits 3 can be overlapped partially as it is shown in FIG. 4, or completely (not shown).

The unobstructed non-overlapped portion of the slit 3 has constant width throughout the length of the slit 3 irrespective of the mutual position of the disks 1 which ensures a uniform flow rate of the contacting phases over the entire surface of the plate and similar hydrodynamic conditions within all the zones thereof, the maximum attainable regulating accuracy of the plate free passage area being provided.

The proposed plate is equally efficacious when operating with a liquid phase or with loose solids and a viscid or pastelike mass.

What is claimed is:

1. A contact plate for a mass-exchange column, comprising: two coaxial planer disks with their end faces facing each other and in close proximity, each of said disks being capable of rotation about their common axis, a hole being formed in each of said disks as a slit in the shape of an Archimedean spiral whose centre coincides with the centre of said disk, said slit extending continuously through the whole of the disk, said hole in one of said disks being in alignment with the corresponding hole in the other of said disks, thereby when one of said disks rotates with respect to the other disk said holes at least partially overlap each other and control the flow rate of reactant materials through the plate.

2. A contact plate according to claim 1, wherein said slit extends continuously through at least three revolutions.

* * * * *